United States Patent
Villamar

(10) Patent No.: US 9,235,213 B2
(45) Date of Patent: *Jan. 12, 2016

(54) AUTOMATED DELIVERY VEHICLE, SYSTEMS AND METHODS FOR AUTOMATED DELIVERY

(71) Applicant: Daniel Judge Villamar, North Las Vegas, NV (US)

(72) Inventor: Daniel Judge Villamar, North Las Vegas, NV (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/869,095

(22) Filed: Apr. 24, 2013

(65) Prior Publication Data

US 2014/0046512 A1    Feb. 13, 2014

Related U.S. Application Data

(60) Provisional application No. 61/850,782, filed on Feb. 22, 2013, provisional application No. 61/742,331, filed on Aug. 7, 2012, provisional application No. 61/743,884, filed on Sep. 12, 2012.

(51) Int. Cl.
| | |
|---|---|
| *G05D 1/00* | (2006.01) |
| *G05D 1/02* | (2006.01) |
| *G06Q 10/08* | (2012.01) |
| *B65G 1/137* | (2006.01) |

(52) U.S. Cl.
CPC ............ *G05D 1/0212* (2013.01); *B65G 1/1375* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 3,492,949 | A * | 2/1970 | Brown | 104/244.1 |
| 3,788,500 | A * | 1/1974 | Lemelson | 414/792.8 |
| 5,720,363 | A * | 2/1998 | Kipp | 186/55 |
| 5,873,259 | A * | 2/1999 | Spillman | 62/396 |
| 2008/0131225 | A1* | 6/2008 | Payne | 410/34 |
| 2013/0131982 | A1* | 5/2013 | Siris | 701/470 |
| 2014/0046512 | A1* | 2/2014 | Villamar | 701/19 |

* cited by examiner

*Primary Examiner* — Adam Alharbi
(74) *Attorney, Agent, or Firm* — Georgiy L. Khayet

(57) ABSTRACT

Provided is a delivery vehicle and methods and systems for automated delivery using the delivery vehicle. The automated delivery method comprises receiving, by a processing device, an order from a buyer. The order specifies one or more products to be delivered to the buyer and itinerary information. The processing device transmits the order to a placer robot. The placer robot positions the one or more products to a delivery vehicle. Then, the delivery vehicle may transport the products to a delivery destination based on the order. The delivery vehicle may be driverless and lightweight and move automatically. The delivery vehicle may move on a flat track using itinerary information of the order. Additionally, the delivery vehicle may use a Global Positioning System to determine own location and compare it to the itinerary information.

17 Claims, 7 Drawing Sheets

AUTOMATED DELIVERY VEHICLE, SYSTEMS AND METHODS FOR AUTOMATED DELIVERY

CROSS-REFERENCE TO RELATED APPLICATIONS

The present utility patent application is related to and claims priority benefit of the U.S. provisional applications No. 61/850,782, filed on Feb. 22, 2013, No. 61/742,331, filed on Aug. 7, 2012, and 61/743,884 filed on Sep. 12, 2012 under 35 U.S.C. 119(e). The contents of this related provisional applications are incorporated herein by reference for all purposes to the extent that such subject matter is not inconsistent herewith or limiting hereof.

FIELD

This application relates generally to transportation vehicles and, more specifically, to an automated delivery vehicles, systems, and methods for minimizing fuel usage when transporting goods from a seller to a buyer.

BACKGROUND

Conventional transportation vehicles, such as automotive or railway vehicles, have some benefits. However, conventional automotive transportation vehicles consume large amounts of fuel, pollute the environment, and create traffic congestion. Conventional railway transportation vehicles are unable to make tight turns, and are too large and heavy to move on conventional street surfaces, while constructing large underground tunnels is expensive.

While these transportation means may be suitable for a particular purpose to which they address, fuel usage when transporting goods from sellers to buyers may be significant. Some of the fuel is applied to transport a driver of a transportation vehicle. Moreover, time spent on shop visiting by buyers or delivering ordered goods by delivery staff may be considerable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a delivery vehicle and methods and systems for automated delivery using the delivery vehicle. The system for automated delivery may include a processing device, a placer robot, and a delivery vehicle. The processing device may be configured to receive an order from a buyer and transmit the order to the placer robot. The order may specify one or more products to be delivered to the buyer and itinerary information. The placer robot may be configured to position one or more products to the delivery vehicle based on the transmitted order. The delivery vehicle may be configured to transport the one or more products based on the transmitted order. The delivery vehicle may ride without a driver along a flat track. To keep the delivery vehicle on the flat track, a guiding pin attached to the delivery vehicle may interlock with a guiding groove. In some embodiments, the guiding groove may be disposed at least partially in the flat track.

The placer robot may include various embodiments based on the product type or product placement type. For example, the placer robot may have one or more arms configured to grasp a product and place the product on the delivery vehicle. In some embodiments, the placer robot may include a liquid product robot placer configured to pour an ordered amount of a product in the delivery vehicle. In other embodiments, the placer robot may include a conveyor robot placer, the conveyor robot placer being configured to move the one or more products into the delivery vehicle.

Additionally, the delivery vehicle may include a Global Positioning System to provide location data associated with a location of the delivery vehicle. The location data may be processed based on the itinerary information and, based on the comparison, instructions on travel distance and travel direction associated with a delivery destination may be adjusted.

Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

A driverless delivery vehicle for automated delivery, systems and methods for automated delivery using the driverless delivery vehicles are described herein. An automated delivery method may enable automated delivery of goods and products to buyer, for example, retail shops, individual buyers, consumers, and so forth. Buyers may order goods or products via network, by phone, or otherwise. An order may be received by a processing device of an automated delivery system and transmitted to a placer robot. The placer robot may pick up goods or products according to the order and position them to the delivery vehicle.

The delivery vehicle may then transport the goods or products to a delivery destination based on the order. The delivery vehicle may be driverless and move to the delivery location automatically. To locate the delivery destination and own position, the delivery vehicle may use a Global Positioning System. The delivery vehicle may be configured to ride along a flat track. The flat track may include a guiding groove disposed in the flat track. The delivery vehicle may interlock with the flat track using a guiding pin contacting with the guiding groove.

In some embodiments, to deliver goods or products, driverless delivery vehicles may be used. The delivery vehicles may include lightweight, small in size vehicles.

For various types of products, the placer robot may include different placer robot types. For example, a liquid product robot placer may be used for liquid products, granular products, bulked products, and so forth. Additionally, the placer robot may include a conveyor robot placer configured to move products into the delivery vehicle and/or a ledge robot placer where ledges supporting products may be removed to place the products into the delivery vehicle.

In some embodiments, a code consisting of any combination of numbers, letters, and/or symbols, may be provided by the buyer via a keyboard or a key pad of a telephone, lap top, tablet PC, or the delivery vehicle itself. Various codes may be associated with various products, thus the automated delivery system may use the provided code to pick up the products associated with the codes and position them to the delivery vehicle.

In some embodiments, the order may include itinerary information associated with the delivery destination. The itinerary information may be used by the delivery vehicle to define an itinerary to the delivery destination and compose itinerary instructions. The delivery vehicle may receive the itinerary information from the processing device and/or placer robot. To store the itinerary information, the delivery vehicle may include a memory unit. The memory unit may include an external hard drive, CD, DVD, and so forth. Additionally, the delivery vehicle may include a processor to execute itinerary instructions.

Figure 1:
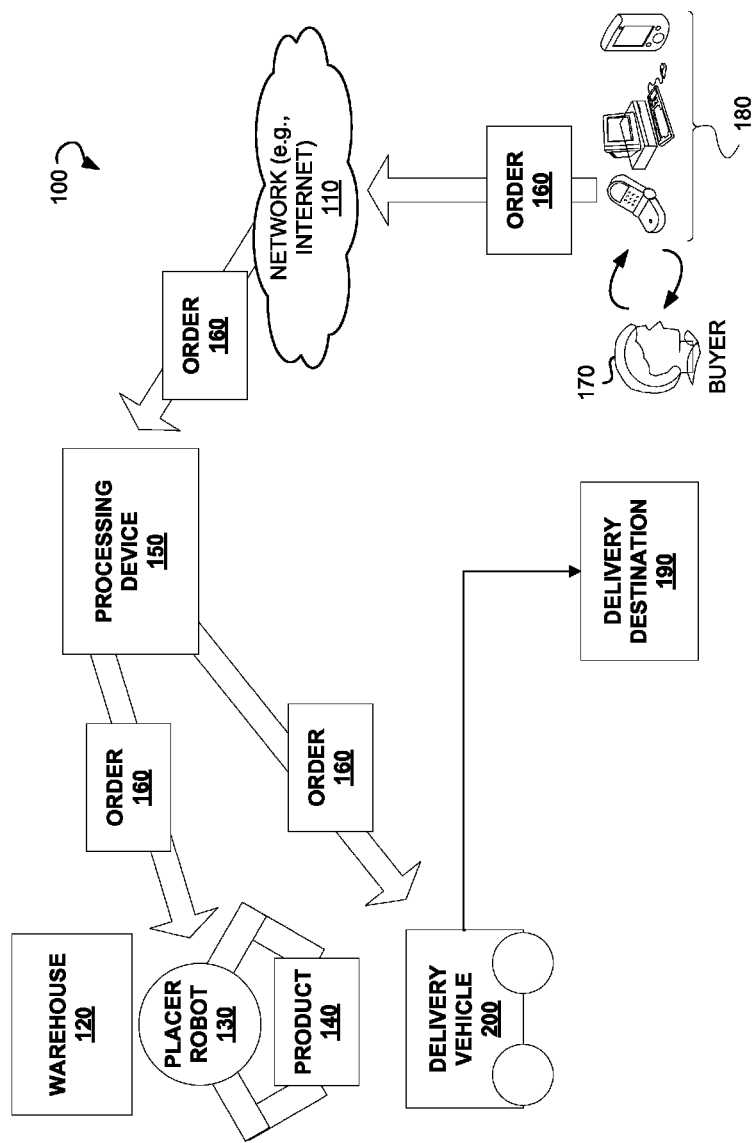
FIG. 1 illustrates an example environment for automated delivery vehicle as well as systems and methods for automated delivery using the vehicle.

Referring now to the drawings, FIG. 1 illustrates an environment 100 within which a delivery vehicle 200, systems and methods for automated delivery using the delivery vehicle 200 can be implemented. The environment 100 may include a network 110, the delivery vehicle 200, a warehouse 120, a placer robot 130, a product 140, a processing device 150, a buyer 170, one or more client devices 180, an order 160, and a delivery destination. The network 110 may include Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication. The delivery vehicle 200 may communicate with the GPS satellite via the network 110 to exchange data on a geographical location of the delivery vehicle 200. Additionally, the delivery vehicle 200 may communicate with mobile network operators using a mobile base station.

The buyer 170, using the one or more client devices 180 may send the order 160 to the processing device 150. The one or more client devices 180 may include a mobile phone, a smartphone, a tablet PC, a lap top, a personal computer, and so forth. The one or more client devices 180 may communicate with the processing device 150 via the network 110 wirelessly or by wires using various connections.

The order 160 may include information on one or more products 140 the buyer wants to be delivered to the delivery destination 190 and itinerary information associated with the delivery destination 190. The itinerary information may include instructions on travel distance and travel direction associated with a delivery destination 190. In some embodiments, information on the product 140 may be provided in the form of an alphanumeric code. An alphanumeric code may be associated with a product and be entered via a mobile phone, a personal computer, a laptop, or a keypad of the delivery vehicle.

The order 160 may be transmitted via network 110 to the processing device 150. The processing device 150 may include a server, a computing device, and so forth. The processing device 150 may optionally process the order 160 to extract information to be transmitted to the placer robot 130 and/or the delivery vehicle 200. Optionally, the processing device 150 may store the order 160 to a database.

The order 160 may be transmitted to the placer robot 130 that may be located in the warehouse 120, a factory, a shop, and so forth. The placer robot 130 may pick up the product 140 based on the order 160. In accordance to some embodiments, the placer robot 130 may pick up the product 140 using an alphanumeric code contained in the order 160.

In some embodiments, the placer robot 130 may communicate with the delivery vehicle 200 to transmit one or more commands to the delivery vehicle 200. For example, the placer robot 130 may transmit to the delivery vehicle 200 a command to approach the placer robot 130 to receive the product 140 associated with the order 160, additionally, the placer robot 130 may transmit a command to deliver the goods or products to the delivery destination 190.

In other embodiments, the order 160 may be transmitted directly to the delivery vehicle 200. The delivery vehicle 200 may then travel to the placer robot 130 and, based on the order 160, transmit a command to position the product 140 in the delivery vehicle 200. The command may be transmitted wirelessly.

The placer robot 130 may have one or more arms configured to grasp a product and place the product on the delivery vehicle. Thus, the placer robot 130 may grasp the product 140 based on the order 160 and position it to the delivery vehicle 200.

The delivery vehicle 200 may transport the product 140 to the delivery destination 190 based on the order 160 and itinerary information, such as instructions on travel distance and travel direction associated with the delivery destination 190.

The delivery vehicle 200 may ride along a flat track, with which it may be interlocked by a guiding pin connected to a guiding groove. The guiding groove may be disposed at least partially in the flat track.

In some embodiments, the delivery vehicle 200 may use a Global Positioning System (GPS) to determine own location and compare it to the itinerary information.

In some embodiments, an enhanced head generator and contact object construction may be used. The construction may include a head, an axle, a generator, and a contact object. The head may be a circular disk shaped object. At least a portion of the head curved outer circumference may be covered with a ring of material that generates traction, such as rubber. At least a portion of the contact object surface may have a ring of gear teeth or may have a ring of rough surface that may resembles the underside of a rubber jar opening cloth. The gear teeth or rough surface may extend down the top end, bottom end, or center of the longest side of the head outer curved circumference. The entire surface area of the head may be covered with traction generating material, such as rubber, gear teeth, or rough surface. The axle may be a cylindrical shaped object. The electric generator may be a machine that produces electricity. The generator may include an armature and a field structure. The contact object may be a rectangular shaped bar. The contact object may resemble a wider rectangle that has a narrower rectangle resting down the longest length of its center. Both faces at the tip ends of the contact object may look like a capital "T" turned to its side.

When the delivery vehicle moves, the contact object attached to the delivery vehicle may come into contact with the head. Such contact may cause the head and the axle to spin. The spinning head and axle may power the generator. As a result of this the generator may generate electricity.

Figure 2:
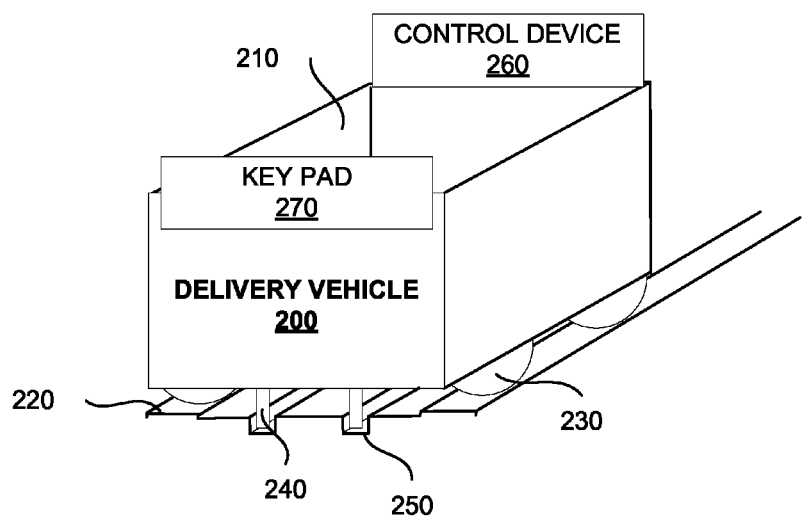
FIG. 2 illustrates an example delivery vehicle, in accordance to certain example embodiments.

FIG. 2 illustrates an example delivery vehicle 200, in accordance to certain example embodiments. The delivery vehicle 200 may include a driverless delivery vehicle and travel without a driver automatically according to instructions processed by a processor. The delivery vehicle 200 may be small in size, thus reducing the weight of the vehicle and correspondingly reducing petrol or energy consumption rate.

The delivery vehicle 200 may comprise a cargo section 210 configured to hold goods or products. A placer robot may position products in the cargo section 210 based on an order received from a buyer.

The delivery vehicle 200 may be used to deliver goods from a factory to a store or warehouse. In other embodiments, the delivery vehicle 200 may be used by individuals to attain goods from stores. For this purpose, the delivery vehicles 200 may be kept by individuals at homes.

The delivery vehicle 200 may comprise one or more wheels 230 configured to move along a flat track 220. The wheels 230 may have a thick wheel lip made of or may be covered in rubber or some other type of material which is suitable for moving on rough surfaces such as concrete or blacktop. The wheel 230 may be configured to allow the delivery vehicle 200 to move on a surface area which has no tracks such as a conventional street surface, and on a set of tracks.

The flat track 220 may provide a surface area on which the wheels 230 of the delivery vehicle 200 may roll. The flat track 220 may be a type of track that is flat and at the same level with the road surface or does not substantially protrude from the road surface. The flat track being substantially on the same level with the road surface will not obstruct drivers as they drive along the road. The flat track 220 may extend down the area where the wheels 230 move.

In some embodiments, the flat track 220 may be configured to lower the rolling resistance that the delivery vehicle 200 encounters while moving, thus enhancing fuel efficiency of the delivery vehicle 200.

The flat track 220 may be made of any solid material, for example, steel, copper, concrete, polished concrete, plastic, wood, and so forth. The flat track 220 may have most of its body submerged underneath the roads surface, except for its top surface. In some embodiments, the flat track may include one or more bars positioned substantially parallel to each other at a distance corresponding to a distance between the wheels 230 of the delivery vehicle 200 on one side and on the other side. Thus, wheels 230 may move on the flat tracks 220.

In various embodiments, flat track 220 may have different shape or form. For example, the flat track 220 may be in a shape of a letter "V", a letter "T", a letter "C" with flat surfaces and angled rather than rounded corners, a shape of a vertically oriented rectangular, and so forth.

In the middle part of the flat tracks 220, one or more channels may be disposed. Such channels, called guiding grooves 250 may be configured to hold one or more guiding pins 240 attached to the delivery vehicle 200. The guiding groove 250 may act as a guide way that allows the delivery vehicle 200 to stay on the flat track 220 and move steadily in the desired direction. The guiding groove 250 may also be placed along a road surface, a tunnel ceiling, and so forth. In some embodiments, the guiding groove 250 may include a single guide way.

The guiding pin 240 may be a spindle shaped object extending downward from the bottom of the delivery vehicle 200. When the delivery vehicle 200 is positioned on the flat track 220, the one or more guiding pins 240 may interlock with the one or more guiding grooves 250. If the flat track 200 turns, the guiding pins may keep the delivery vehicle 200 on the flat track 220. Thus, the guiding pin 240 may allow delivery vehicle 200 to make turns without changing its direction.

In other embodiments, the guiding pin 240 may extend upward from the delivery vehicle 200. In this case, the guiding groove 250 may be located, for example, on the surface of a tunnel ceiling.

To slow the delivery vehicle 200, the delivery vehicle 200 may comprise a groove break (not shown). The groove break may be a gripping object extending downward from the delivery vehicle 200. The groove break may be configured to grip a groove ledge disposed within the guiding groove 250. The groove break may extend downward from the delivery vehicle 200 and be positioned between the walls of the guiding groove 250 when the delivery vehicle 200 is moving on the flat track 220. The groove break may grip a special ledge called the groove ledge which may slow down the delivery vehicle 200.

In some embodiments, the delivery vehicle 200 may move next to a side walk over or next to a gutter. People walking on the sidewalk may be protected a rail and/or a wall. The guide way may be raised over the gutter.

Additionally, to receive orders, itinerary information, and other information from a processing device and to control an itinerary, the delivery vehicle 200 may comprise a control device 260.

In some embodiments, the delivery vehicle 200 may use electronic instructions that communicate driving directions to a specific delivery destination. The electronic instructions may be stored in a memory unit that may be included in the delivery vehicle 200, in the processing device, and so forth. The electronic instructions that communicate driving directions may be retrieved by the delivery vehicle 200 to facilitate finding a particular location after the delivery vehicle 200 has been to that particular location once before.

In some embodiments, the delivery vehicle 200 may be configured to connect to an information storage device. The information storage device may contain the directions on how to get to a particular location. One storage device may contain directions that direct the delivery vehicle 200 to one retail store, and another storage device may contain driving directions on how to get to a different retail store.

In some embodiments, a key pad 270 may be disposed on a side, top, or bottom part of the delivery vehicle 200. The key pad 270 may be used to receive an alphanumeric code associated with a product to be delivered to a buyer. The alphanumeric code may be then transmitted to a placer robot using the control device 260.

In various embodiments, the alphanumeric code may be entered via a mobile phone, a personal computer, a laptop, or a keypad 270 of the delivery vehicle 200. For example, a buyer may dial the code 793954 on the telephone key pad to order a loaf of a particular brand of bread. To order 10 loafs of the desired brand of bread, the buyer may first dial 793954 and then dial #10 for 10 loaves of the desired brand of bread. The code sequence would appear as 7939543#10. If the buyer wants to order 4 loaves of a desired brand of bread, then the buyer may dial 793954#04 for 4 loaves of bread.

In some embodiments, the delivery vehicle 200 may include a GPS providing location data associated with a location of the delivery vehicle 200. The location data may be processed based on the itinerary information to reach the delivery destination.

Figure 3:
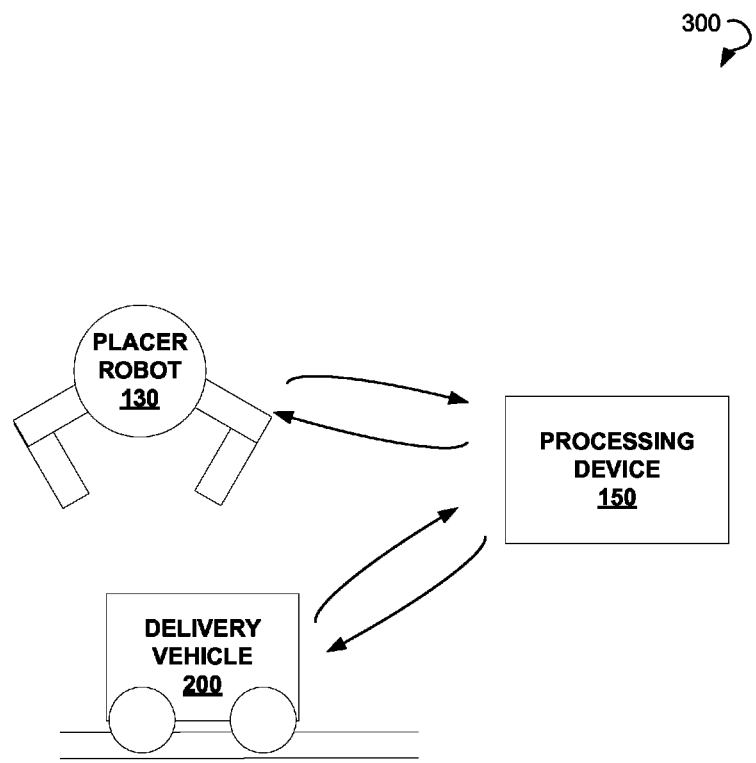
FIG. 3 illustrates an example system for automated delivery, in accordance to certain example embodiments.

FIG. 3 illustrates an example system 300 for automated delivery, in accordance to certain example embodiments. The system 300 may comprise a processing device 150, a placer robot 130, and a delivery vehicle.

The processing device 150 may be configured to receive an order from a buyer and transmit the order to the placer robot 130 and/or to the delivery vehicle 200. The order may specify products to be delivered to the buyer and itinerary information. The processing device 150 may be further configured to enable communication between the placer robot 130 and the delivery vehicle 200 wirelessly or by wires. The processing device 150 may receive orders via a network wirelessly or by wires.

The placer robot 130 may be configured to position the products to the delivery vehicle 200 based on the transmitted order. The placer robot 130 may use lasers, sonar, stereo cameras, and/or other types of sensors or any specific mechanism to take measurements regarding the positioning and distance of the product that is to be delivered to the buyer, and the positioning and distance of the delivery vehicle 200 that will deliver the product to the buyer. The placer robot 130 may take measurements regarding the positioning and distance of the product that is to be delivered, and pick up the product and place it into the delivery vehicle 200 with precision.

In some embodiments, the placer robot 130 may function under computer control. The placer robot 130 may move along tracks on a shelf.

The placer robot 130 may have various embodiments. For example, it may have one or more arms to position products to the delivery vehicle 200. In other embodiments, the placer robot 130 may include a conveyor or a dispensing unit. Various embodiments of the placer robot 130 will be described with reference to FIGS. 5-7.

Figure 4:
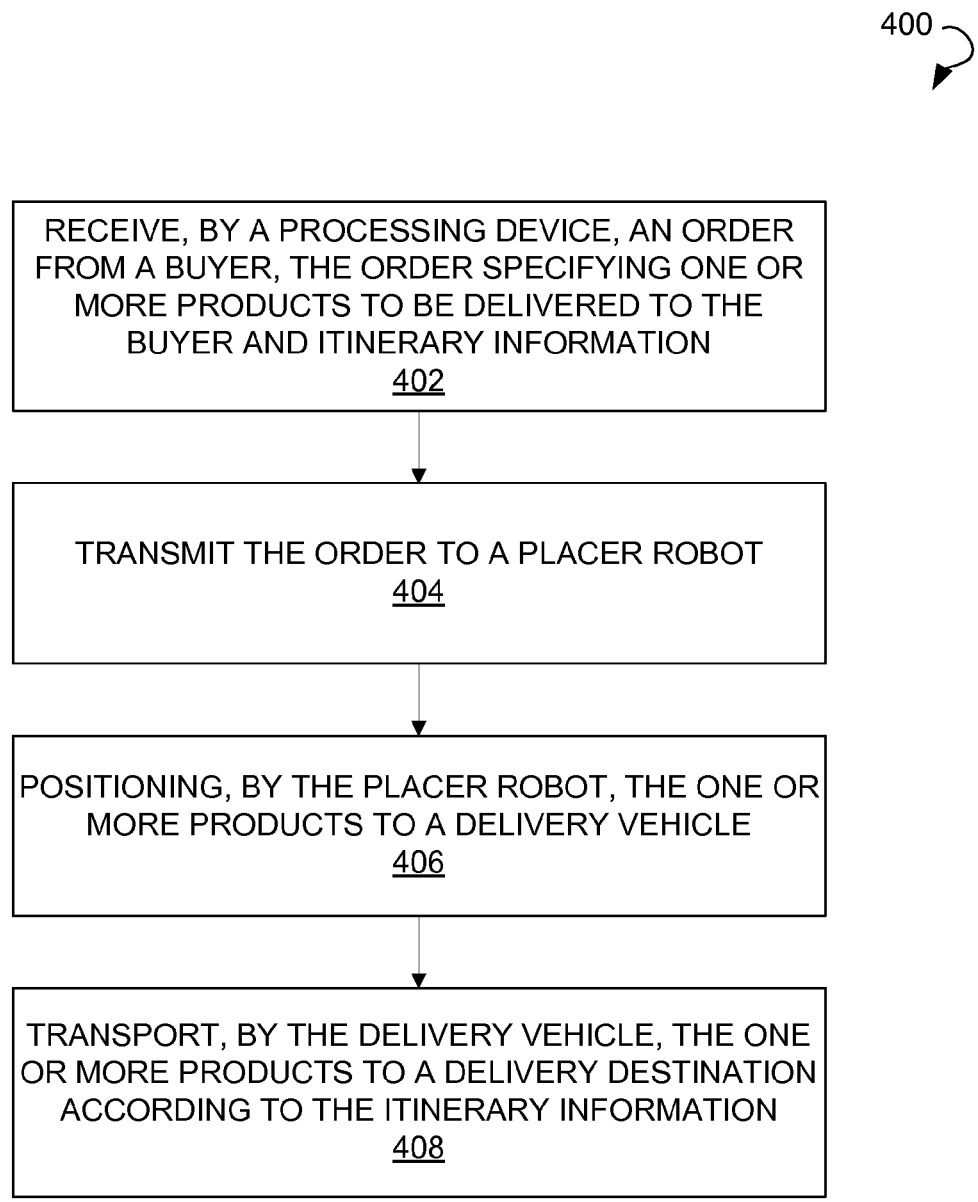
FIG. 4 illustrates is a flow chart illustrating a method for automated delivery, in accordance to certain example embodiments.

FIG. 4 illustrates is a flow chart illustrating a method 400 for automated delivery, in accordance to certain example embodiments. Method 400 may start with a receiving, at operation 402, an order from a buyer. The order may specify one or more products to be delivered to the buyer and/or itinerary information. The order may be received by a processing device and transmitted by the processing device to a placer robot and a delivery vehicle at operation 404.

At operation 406, the placer robot may position the one or more products to the delivery vehicle. To locate the placer robot may use various sensing units and/or mechanisms. The product placer may include one or more arms to grasp a product and position it to the delivery vehicle. When the products according to the order are positioned to the delivery vehicle, the delivery vehicle may transport the products to the delivery destination at operation 408. To reach the delivery destination the delivery vehicle may travel on a flat track that may be embedded in a road surface at least partially. To locate the delivery destination, the delivery vehicle may use itinerary information contained in the order. The itinerary information may include instructions on travel distance and travel direction associated with the delivery destination.

Additionally, the delivery vehicle may include a GPS to provide location of the delivery vehicle and adjust itinerary information if necessary.

Figure 5:
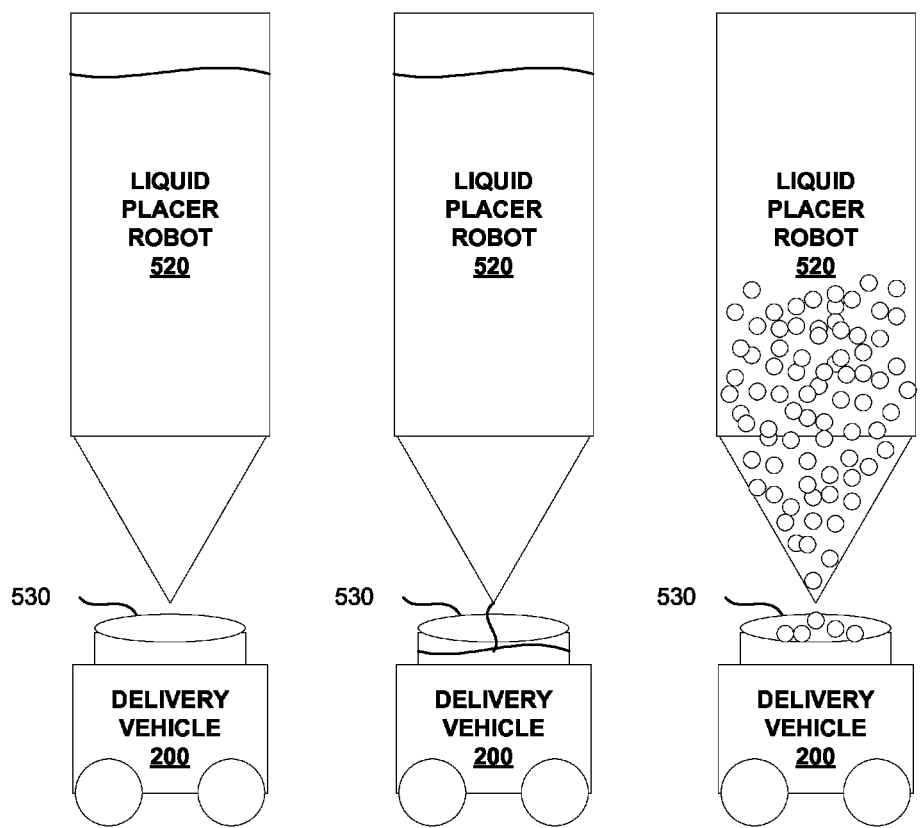
FIG. 5 illustrates a liquid placer robot, in accordance to certain example embodiments.

FIG. 5 illustrates a liquid placer robot 520, in accordance to certain example embodiments. The liquid placer robot 520 may be configured to dispense liquid, solid, and/or granular products, for example, milk, juice, porridge, dog food, and so forth. The liquid placer robot 520 may include a container 530. The container 530 for the product may be positioned in the delivery vehicle. The container 530 may help to eliminate the use of expandable packaging. To fill the container 530 with the product 520, the delivery vehicle may move to the liquid placer robot 520.

For example, the product may pour in the container 530 due to the gravity force after the liquid placer robot 520 opens a tap.

Figure 6:
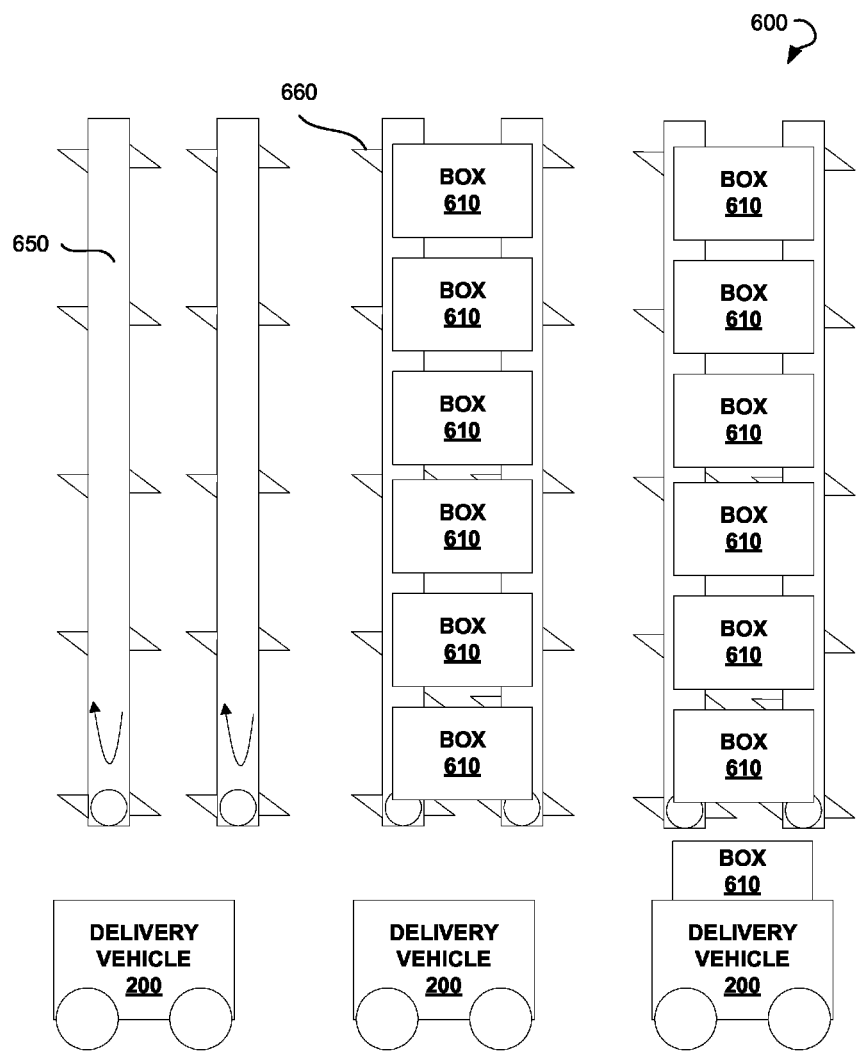
FIG. 6 a conveyor placer robot, in accordance to certain example embodiments.

FIG. 6 a conveyor placer robot 600, in accordance to certain example embodiments. The conveyor placer robot 600 may include a conveyor 650 which houses products moves items into to delivery vehicle 200. The products to be positioned by the conveyor placer robot 600 may include boxes 610 of cereal, loafs of bread, canned food, and so forth.

Additionally, the conveyor placer robot 600 may include one or more ledges 660 configured to attach and detach from the conveyor belt to support the boxes 610 while they move to the delivery vehicle 200.

Figure 7:
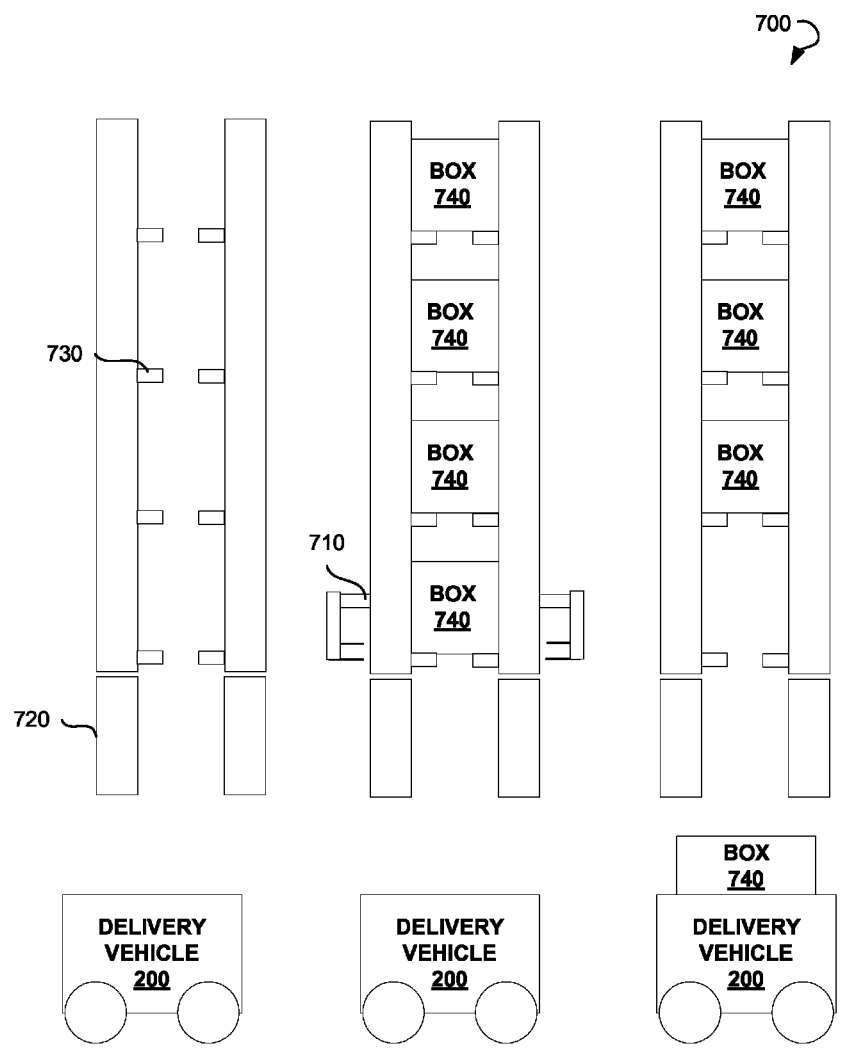
FIG. 7 a ledge placer robot, in accordance to certain example embodiments.

FIG. 7 a ledge placer robot 700, in accordance to certain example embodiments. The ledge placer robot 700 may include sets of ledges 730 configured to hold a box 740. The box 740 may include various products, such as boxes of cereals, canned food, and so forth.

To release the box 740 from a hold, robot arms 710 may move to the ledges 730 holding the box 740 and remove the ledges 730. The ledges 330 may retract and the box 740 may drop down in the delivery vehicle 200. The ledges 730 may include one or more springs to allow the ledges 730 to extend forward after retracting. In some embodiments, the ledges 730 may be detachable, and may be replaced with ledges of different sizes and shapes. The box 740 within the ledge placer robot 700 may drop down into the delivery vehicle 200 or a mechanical placer device 720 located at the bottom of the ledge placer robot 700. If the box 740 drops down into the mechanical placer device 720, then the mechanical placer device 720 may place the box 740 into the delivery vehicle 200. There can be one row of ledges 730 inside of ledge placer robot 700, or more than one row of ledges 730.

Thus, various systems and methods for automated delivery using a driverless delivery vehicle have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. An automated delivery system comprising:
a processing device configured to receive an order from a buyer and transmit the order to a placer robot, the order specifying one or more products to be delivered to the buyer and itinerary information;
the placer robot configured to position the one or more products to a delivery vehicle based on the transmitted order, wherein the placer robot includes a liquid product robot placer, the liquid product robot placer being configured to pour an ordered amount of the one or more products in the delivery vehicle, the one or more products including a liquid product, a granular product, and a solid product;
the delivery vehicle configured to transport the one or more products based on the transmitted order, the delivery vehicle riding along on a flat track, wherein the flat track is substantially on an uniform level with a road surface, and wherein the delivery vehicle includes at least one wheel and at least two guiding pins on the bottom of the vehicle, the at least two guiding pins being configured to interlock with a guiding groove disposed in the flat track;
wherein the delivery vehicle includes a Global Positioning System, the Global Positioning System providing location data associated with a location of the delivery vehicle, the location data being processed based on the itinerary information to locate a delivery destination and to control an itinerary of the delivery vehicle.

2. The automated delivery system of claim 1, wherein the order is received via a network wirelessly or by wires.

3. The automated delivery system of claim 1, wherein the itinerary information includes instructions on travel distance and travel direction associated with a delivery destination.

4. The automated delivery system of claim 1, wherein the delivery vehicle has no driver and travels automatically.

5. The automated delivery system of claim 1, wherein the order includes an alphanumeric code associated with a product, the code being entered via a mobile phone, a personal computer, a laptop, or a keypad of the delivery vehicle.

6. The automated delivery system of claim 1, wherein the placer robot has one or more arms configured to grasp a product and place the product on the delivery vehicle.

7. The automated delivery system of claim 1, wherein the placer robot includes a conveyor robot placer, the conveyor robot placer being configured to move the one or more products into the delivery vehicle.

8. The automated delivery system of claim 1, wherein the delivery vehicle communicates with the placer robot wirelessly.

9. An automated delivery method comprising:
receiving, by a processing device, an order from a buyer, the order specifying one or more products to be delivered to the buyer and itinerary information;
transmitting the order to a placer robot;
positioning, by the placer robot, the one or more products to a delivery vehicle based on the transmitted order, wherein the placer robot includes a liquid product robot placer, the liquid product robot placer being configured to pour an ordered amount of the one or more products in the delivery vehicle, the one or more products including a liquid product, a granular product, and a solid product;
locating a delivery destination based on location data associated with a location of the delivery vehicle, the location data being received from a Global Positioning System associated with the delivery vehicle, wherein the location data is processed based on the itinerary information;
transporting, by the delivery vehicle, the one or more products based on the transmitted order to a delivery destination according to the itinerary information, an itinerary of the delivery vehicle being controlled using the location data, wherein the delivery vehicle is configured to ride along on a flat track, wherein the flat track is substantially on an uniform level with a road surface, the delivery vehicle including at least one wheel and at least two guiding pins on the bottom of the vehicle, the at least two guiding pins being configured to interlock with a guiding groove disposed in the flat track.

10. The automated delivery method of claim 9, wherein the order is transmitted to the delivery vehicle, the delivery vehicle communicating with the placer robot to send a command to cause the placer robot to position the one or more products to a delivery vehicle based on the order.

11. The automated delivery method of claim 9, wherein the placer robot has one or more arms configured to grasp a product and place the product on the delivery vehicle.

12. The automated delivery system of claim 9, wherein a container is placed in the delivery vehicle, the liquid product robot placer pouring the product in the container.

13. The automated delivery system of claim 9, wherein the placer robot includes a conveyor robot placer, the conveyor robot placer being configured to move the one or more products into the delivery vehicle.

14. The automated delivery system of claim 9, wherein the delivery vehicle communicates with the placer robot wirelessly.

15. The automated delivery system of claim 9, further comprising:
processing the order to retrieve order data;
storing the order data in a database.

16. A delivery vehicle, the delivery vehicle being a driverless delivery vehicle, comprising:
a cargo section configured to hold one or more products, the one or more products positioned in the cargo section by a placer robot, wherein the placer robot includes a liquid product robot placer, the liquid product robot placer being configured to pour an ordered amount of the one or more products in the delivery vehicle, the one or more products including a liquid product, a granular product, and a solid product;
one or more wheels configured to move along on a flat track, wherein the flat track is substantially on an uniform level with a road surface;
at least two guiding pins configured to interlock with one or more guiding grooves disposed in the flat track;
a groove break configured to slow the delivery vehicle, the groove break being configured to grip a groove ledge, the groove ledge disposed within the guiding groove;
a Global Positioning System configured to provide location data associated with a location of the delivery vehicle, the location data being processed based on the itinerary information to locate a delivery destination; and
a control device configured to receive itinerary information from a processing device and control an itinerary of the delivery vehicle using the location data and the delivery destination.

17. The delivery vehicle of claim 16, further comprising a key pad configured to receive an alphanumeric code associated with a product.

* * * * *